(12) United States Patent
Vance et al.

(10) Patent No.: US 7,301,066 B2
(45) Date of Patent: Nov. 27, 2007

(54) METHOD OF MAKING AND USING NANOSCALE METAL

(75) Inventors: David Vance, Houston, TX (US); Suthan S. Suthersan, Yardley, PA (US); Peter Palmer, Lutz, FL (US)

(73) Assignee: Arcadis G&M, Inc., Highlands Ranch, CO (US)

( * ) Notice: Subject to any disclaimer, the term of this patent is extended or adjusted under 35 U.S.C. 154(b) by 251 days.

(21) Appl. No.: 10/890,066

(22) Filed: Jul. 12, 2004

(65) Prior Publication Data

US 2004/0245187 A1 Dec. 9, 2004

Related U.S. Application Data

(63) Continuation of application No. 10/026,329, filed on Dec. 19, 2001, now Pat. No. 6,777,449.

(60) Provisional application No. 60/257,917, filed on Dec. 21, 2000.

(51) Int. Cl.
*A62D 3/00* (2006.01)
*B09C 1/08* (2006.01)

(52) U.S. Cl. .............. 588/406; 588/400; 588/402; 588/319; 405/128.5; 405/128.75; 405/263; 210/749; 210/757

(58) Field of Classification Search ............ 516/33; 588/406, 401, 402, 400, 319; 405/128.75, 405/263, 128.5; 210/749, 757
See application file for complete search history.

(56) References Cited

U.S. PATENT DOCUMENTS

| | | | |
|---|---|---|---|
| 3,580,862 A | 5/1971 | Watson et al. | ............ 252/309 |
| 3,586,624 A | 6/1971 | Larson | |
| 3,640,821 A | 2/1972 | Sweeny et al. | |
| 3,737,384 A | 6/1973 | Sweeny et al. | |
| 4,080,177 A | 3/1978 | Boyer | ............ 44/51 |
| 4,219,419 A | 8/1980 | Sweeny | |
| 4,288,174 A | 9/1981 | Laws | |
| 4,293,421 A | 10/1981 | Green | |
| 4,382,865 A | 5/1983 | Sweeny | |

(Continued)

FOREIGN PATENT DOCUMENTS

EP 0507925 B1 8/1997

(Continued)

OTHER PUBLICATIONS

McMurtry, D.C., Elton, R.O. New Approach to In-Situ Treatment of Contaminated Groundwaters. Environmental Progress, 4(3):168-70 (1985), month unknown.

(Continued)

*Primary Examiner*—Daniel S. Metzmaier
(74) *Attorney, Agent, or Firm*—Sheridan Ross P.C.

(57) ABSTRACT

Methods of treating ground water and methods for reducing contaminants (e.g., chlorinated compounds in contaminated ground water) to harmless compounds in the presence of an elemental metal treatment composition. Said methods comprise injecting a treatment solution comprising a colloidal suspension of elemental metal particles (e.g., iron, a tin, a zinc, a palladium and mixtures thereof) having a nanoscale particle size and a carbohydrate in an organic liquid (e.g., dodecane, butyl acetate and polypropylene glycol ethyl ether acetate and mixtures thereof) into the ground, proximate to the contaminated ground water.

20 Claims, 5 Drawing Sheets

U.S. PATENT DOCUMENTS

| | | | |
|---|---|---|---|
| 4,696,739 A | 9/1987 | Pedneault | |
| 5,054,961 A | 10/1991 | Sherman | |
| 5,057,227 A | 10/1991 | Cohen | |
| 5,160,452 A * | 11/1992 | Marutsuka et al. | 516/33 |
| 5,266,213 A | 11/1993 | Gillham | |
| 5,322,751 A | 6/1994 | Chou et al. | 430/33 |
| 5,355,948 A * | 10/1994 | Sparlin et al. | 166/228 |
| 5,362,394 A | 11/1994 | Blowes et al. | |
| 5,405,509 A | 4/1995 | Lomasney et al. | |
| 5,480,579 A | 1/1996 | Seech et al. | |
| 5,551,807 A | 9/1996 | Breaux | |
| 5,575,919 A | 11/1996 | Santina | 210/695 |
| 5,712,219 A | 1/1998 | Klabunde et al. | 502/328 |
| 5,759,939 A | 6/1998 | Klabunde et al. | 502/328 |
| 5,783,088 A | 7/1998 | Amonette | 210/679 |
| 5,788,738 A | 8/1998 | Pirzada et al. | 75/331 |
| 5,794,727 A * | 8/1998 | Murray | 175/394 |
| 5,803,174 A | 9/1998 | Gilmore et al. | 166/292 |
| 5,849,201 A | 12/1998 | Bradley | 210/752 |
| 5,851,507 A | 12/1998 | Pirzada et al. | 423/659 |
| 5,857,810 A | 1/1999 | Cantrell et al. | 405/263 |
| 5,911,882 A | 6/1999 | Benjamin et al. | |
| 5,914,436 A | 6/1999 | Klabunde et al. | 588/205 |
| 5,922,299 A | 7/1999 | Bruinsma et al. | 423/335 |
| 5,922,926 A | 7/1999 | Back et al. | 588/205 |
| 5,975,798 A * | 11/1999 | Liskowitz et al. | 405/128.5 |
| 5,990,373 A | 11/1999 | Klabunde | 588/200 |
| 6,039,882 A * | 3/2000 | Wolfe et al. | 405/128.75 |
| 6,057,488 A | 5/2000 | Koper et al. | 588/200 |
| 6,093,328 A | 7/2000 | Santina | 210/679 |
| 6,390,192 B2 * | 5/2002 | Doesburg et al. | 166/230 |
| 6,828,141 B2 | 12/2004 | Kataoka et al. | |

FOREIGN PATENT DOCUMENTS

| | | |
|---|---|---|
| EP | 0528901 B1 | 8/1997 |
| WO | 9110624 A1 | 7/1991 |

OTHER PUBLICATIONS

Thomson, B.M., Shelton, S.P. Permeable Barriers: A New Alternative for Treatment of Contaminated Ground Waters. National Water Well Association, Dublin OH, 1988 (abstract only), month unknown, online @ http://mdl.csa.com/partners/viewrecord.php/ , (Jan. 2007) pp. 1.

* cited by examiner

METHOD OF MAKING AND USING NANOSCALE METAL

CROSS REFERENCE TO RELATED APPLICATIONS

This application is a continuation of U.S. patent application Ser. No. 10/026,329, filed Dec. 19, 2001, now U.S. Pat. No. 6,777,449, which claims the benefit of U.S. Provisional Patent Application Ser. No. 60/257,917 filed Dec. 21, 2000. Both of these applications are incorporated here in their entirety by this reference.

BACKGROUND AND SUMMARY OF THE INVENTION

Since the mid-1990's, there have been a series of dramatic developments for the in-situ treatment of chlorinated solvents. The approach of the present invention is based on the sequential reduction of chlorinated hydrocarbons to innocuous end products such as methane, ethane or ethene. In principal the process has been recognized in scientific circles but it is just beginning to be investigated for environmental application. The process exploits the use of zero valence state elemental metals to reductively dehalogenate halogenated hydrocarbons. In addition, elemental metals may be used to reduce soluble metals such as chromate to insoluble species (Cr (III)) or metalloids such as arsenic or selenium.

The most common metal being utilized for this purpose is iron. But other metals including tin, zinc, and palladium have also been shown to be effective. The process may be best described as anaerobic corrosion of the metal by the chlorinated hydrocarbon. During this process, the hydrocarbon is adsorbed directly to the metal surface where the dehalogenation reactions occur. Increasing surface area (by reducing the size of iron particles) increases the effectiveness of the process.

The variations of the process are complex. Recent research on iron systems indicates three mechanisms at work in the reductive process.

Metallic iron may act as a reductant by supplying electrons directly from the metal surface to the adsorbed halogenated compound.

Metallic iron may act as a catalyst for the reaction of hydrogen with the halogenated hydrocarbon. The hydrogen is produced on the surface of the iron metal as the result of corrosion with water.

Also ferrous iron solubilized from the iron metal due the above reactions may act as a reductant for the dehalogenation of halogenated hydrocarbons.

The rate of the reaction of the metallic iron with halogenated hydrocarbons has been demonstrated to be partially dependent upon the surface area of the metallic iron. As the size of the metallic iron is reduced, surface area goes up as well as chemical reactivity. Initial applications of this technology used iron filings. More recent applications have used iron colloids in the micron size range. The applications of the metallic iron reduction of the present invention incorporate nanoscale colloids. These are colloids that range in size from 1 to 999 nanometers. A colloid of this size may have several advantages in application for in-situ groundwater treatment or for use in above ground treatment reactors. These advantages include:

High surface area with greater reaction kinetics as a result.
The increase in kinetics allows for a lower mass loading of iron in the treatment zone or reactor because the residence time required for complete dehalogenation is decreased.

The small size and greater reactivity of the colloid allows for the application of the technology through direct in-situ injection into the subsurface.

The smaller size allows for advective colloidal transport.

The greater reactivity, due to the small size, allows for much lower overall iron mass requirements.

To further enhance the physical and chemical character of the colloid, a metallic catalyst may be used to create a bimetallic colloid. The catalyst further increases the rates of reactions, which further lowers the amount of iron colloid that must be used to create an effective reductive dehalogenation treatment zone in the subsurface or a surface reactor. Metals that may be used as a catalyst with the iron include palladium, platinum, nickel, zinc, and tin.

Production of Nano-Scale Iron Colloids

Introduction

A key limitation on the development of the technology of the present invention is the lack of availability of nanoscale metallic colloids. Research, driven primarily by the materials science needs (hi-tech electronic chips or component industry products) has, over the last decade, contributed to general technologies designed to produce nanoscale colloids. Although, generally the research has been in the area of colloids that are composed of ceramic or other non-metallic inorganic materials and not metal colloids. A significant part of the development effort for the technology of the present invention was the adaptation of the non-metallic nanoscale colloid production methods to the production of metallic nanoscale colloids of the present invention.

The method for the production of metal colloids in the nanoscale range may be divided into two primary approaches:

"Bottom Up" in which colloids of the appropriate size are produced by being assembled from individual atoms.

"Top Down" in which colloids of the appropriate size are produced by attrition of larger existing particles of the metal.

The "Bottom Up" approach has a greater number of potentially applicable methods, including:

Chemical reduction using sodium borohydride; various soluble metal salts (such as ferrous or ferric chloride for iron) in suspensions of water or various hydrocarbon solvents. This process may or may not be enhanced with sonofication during reaction processes.

Other chemical precipitation reactions in aqueous or hydrocarbon solutions capable of producing metals from soluble salts that may or may not include sonofication during reaction processes.

Various methods of metal volatilization and subsequent deposition, typically under vacuum. These include:
Gas Evaporation
Active Hydrogen-Molten Metal Reactions
Sputtering
Vacuum Evaporation to Running Oil Surface
Evaporation Using Direct Electrical Current Heating
Hybrid Plasmas The "Top Down" approach uses two primary variations of milling or mechanical comminution, this includes:

Using mechanical agitation of a mixture of the desired colloidal metal, a grinding media, and an organic or aqueous suspension fluid. Examples include ball mills and rod mills.

Systems similar to the above where the mechanical agitation is provided by high-speed gas jets.

Upon searching for a supply of nanoscale colloids the inventors of the present invention found that the only method of production capable of producing nanoscale colloids in large kilogram amounts was the sodium borohydride reduction method. However, this was expensive (up to $5,000 per kilogram) and not practical for full-scale application of the technology.

After an evaluation of other production methods the following determinations were made:

Metal volatilization was also expensive, the reactors available for the production of colloids were limited to kilogram capacities, and the colloids produced are at the lower end of the nanoscale range (typically less than 10 nanometers). With time and further development these technologies may also be applied to the production of nanoscale iron colloids for environmental use.

"Top Down" mechanical attrition had the potential of:
Generating colloids of the proper size
Colloid production at a reasonable cost ($100 a kilogram or less)
Production capacity in the 100 to 1000 kilogram range.

However, at the time of the evaluation there was no existing capacity (of any size) for the production of iron colloids using mechanical attrition. All work in the field was being performed on ceramics or other non-metallic inorganic materials. The inventors of the present invention sought a provider of nanoscale ceramic production and generated the specifications and requirements for the production of nanoscale iron colloids.

Production of Nanoscale Colloids by Mechanical Attrition

Nanoscale colloids have been produced in amounts up to 10 kilograms, with scale-up production volumes readily and cost effectively available. The process developed to date includes the following components:

Feed material consisting of approximately <325 mesh sized iron particles.
Organic suspension solvent fluids that:
Have high flash points to prevent explosions; and
Are not reactive to the surface of the iron colloid
Examples may include dodecane, butyl acetate, and polypropylene glycol ethyl ether acetate
Dispersants to act as surface acting agents to prevent the agglomeration of the colloids during the milling process were used.
Examples include SOLSPERSE® 20,000, SOLSPERSE® 24,000, SOLSERSE® 32,600, SOLSEPERSE® 32,500, DISPERBYK® 108, DISPERBYK® 164, and DISPERBYK® 167.
The materials are placed in a high energy ball milling system that is capable of using grinding media as small as 0.2 mm
Rate of agitation and time of milling are further parameters that are used to control generation of a nanoscale iron colloid of the desired properties. Lower energy milling is used initially to insure proper mixing of the solvent, dispersion, and iron components.

Production Method Effects on Colloid Morphology

Each of the production methods described above produces colloids that have distinct morphology and internal crystal structure. In addition, it is important to recognize that in the nanoscale range quantum size effects begin to become apparent. For example a colloid of 10-nanometer diameter has about 30% of its atoms in grain boundaries (which are highly reactive and subject to quantum effects). These features may have an effect on the physical/chemical behavior of the colloid in use. These effects fall into two broad categories that reflect on production by "Bottom Up" or "Top Down" methods.

A colloid produced by chemical precipitation or reduction, or through the various vapor deposition methods may be nano-structured. This means that the colloid may have nanoscale crystal domains with sharp boundaries between crystals. The grain boundaries are typically only 1 atom thick and there is low dislocation density in the crystal structures.

The reactivity of a colloid of this type may be controlled primarily through the selection of an appropriate overall colloid size and resulting surface area. Smaller size means greater surface area and reactivity; larger size means lower surface area and reactivity.

A colloid produced by mechanical attrition may be nanocrystalline. The crystal domains in the colloid are, relative to the overall colloid size, small. The individual crystal domains are separated by wide amorphous transition regions that exhibit a very high dislocation density. These transition regions may be as large as the crystal domains, but are still termed grain boundaries.

The amorphous transition regions may be highly reactive. The size and intensity of dislocation density of the amorphous boundary regions rather than the absolute size of the colloid may dominate the reactivity of the colloid. A relatively large colloid produced by this method may have the same or greater reactivity than a much smaller colloid produced by "Bottom Up" methods.

Control of the reactivity of the colloid is a critical feature. The iron undergoes anaerobic corrosion when reacted directly with halogenated solvents or when reacted with water to produce hydrogen. As the reactivity of the colloid increases the hydrogen production rate increases as well. By controlling the rate of hydrogen production using the methods described above, one may design reactive metal colloids with reactivity that will generate hydrogen at the rate required for the desired dehalogenation processes rather than at excessively higher rates (with just water) at which the iron colloid would be consumed (by the water) without reacting with the halogenated solvents undergoing treatment. Control of this type is particularly important for in-situ applications.

Important factors in the control of the colloid morphology using chemical precipitation include:
Concentration of reagents
Variations in the composition of the metal salt used as a feed material
Composition of the suspending solvents
Composition of the reducing agent
Temperature at which the reactions take place
The use and energy of mechanical agitation including sonification.

Important factors in the control of the colloid morphology using vapor deposition methods include:
Temperature of vaporization reactor
Temperature in the deposition/collector zone
Composition of metal (effects of alloying in addition to elemental composition)
Composition of coating fluids in the collector
Rate of deposition Important factors in the control of the colloid morphology using mechanical attrition include:

Composition of metal (alloy effects as well elemental composition)
Type and concentration of suspending solvent
Type and concentration of dispersion agent
Size and shape of metal feed stock particles (and concentration in suspension)
Size and shape of grinding media (and amount in suspension)
Energy/rate of ball milling
Time of milling
If gas agitation is used:
Gas composition
Gas pressure, flow rate and configuration of injection system.

Post-production processes may also impact colloid morphology and crystal structure, these post-production processes include:
Annealing
To various temperatures ranging from room temperature to the melting point of the colloid
At various heating rates and total annealing times
In the presence of various gases
Treatment with other aqueous or organic solutions
Drying processes including:
The use of heat
The use of evaporation
Vacuum drying
The composition of the blanketing gas used during the drying process.

Through the manipulation of the colloid size, morphology, and crystal structure using the above process it is possible to design colloids for variations in specific contaminant types, concentrations, groundwater or reactor flow velocities, subsurface permeability, and provide some control over the transport properties of the colloids during injection.

BRIEF DESCRIPTION OF THE DRAWINGS

In addition to the novel features and advantages mentioned above, other objects and advantages of the present invention will be readily apparent from the following descriptions of the drawings and preferred embodiments, wherein.

DETAILED DESCRIPTION OF THE PREFERRED EMBODIMENTS

Figure 1:
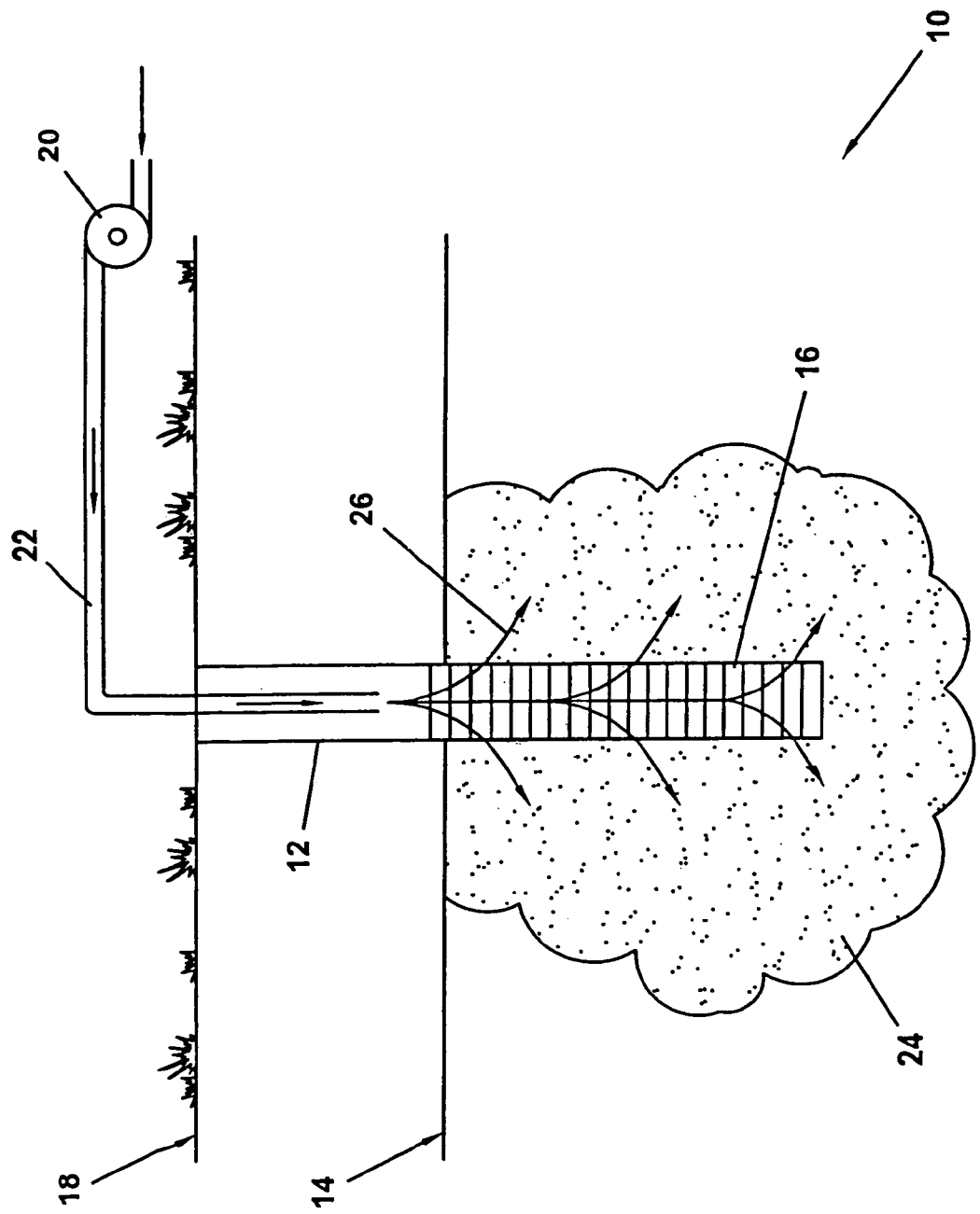
FIG. 1 is a schematic view of one preferred embodiment of the present invention.

FIG. 1 illustrates a method of the present invention 10 for injecting the nanoscale metal 26 of the present invention by pump 20 through an injector 22 into an open bore hole 12 through a screen 16 into a plume 24 that is located beneath ground level 18 and beneath the water table 14.

Figure 2:
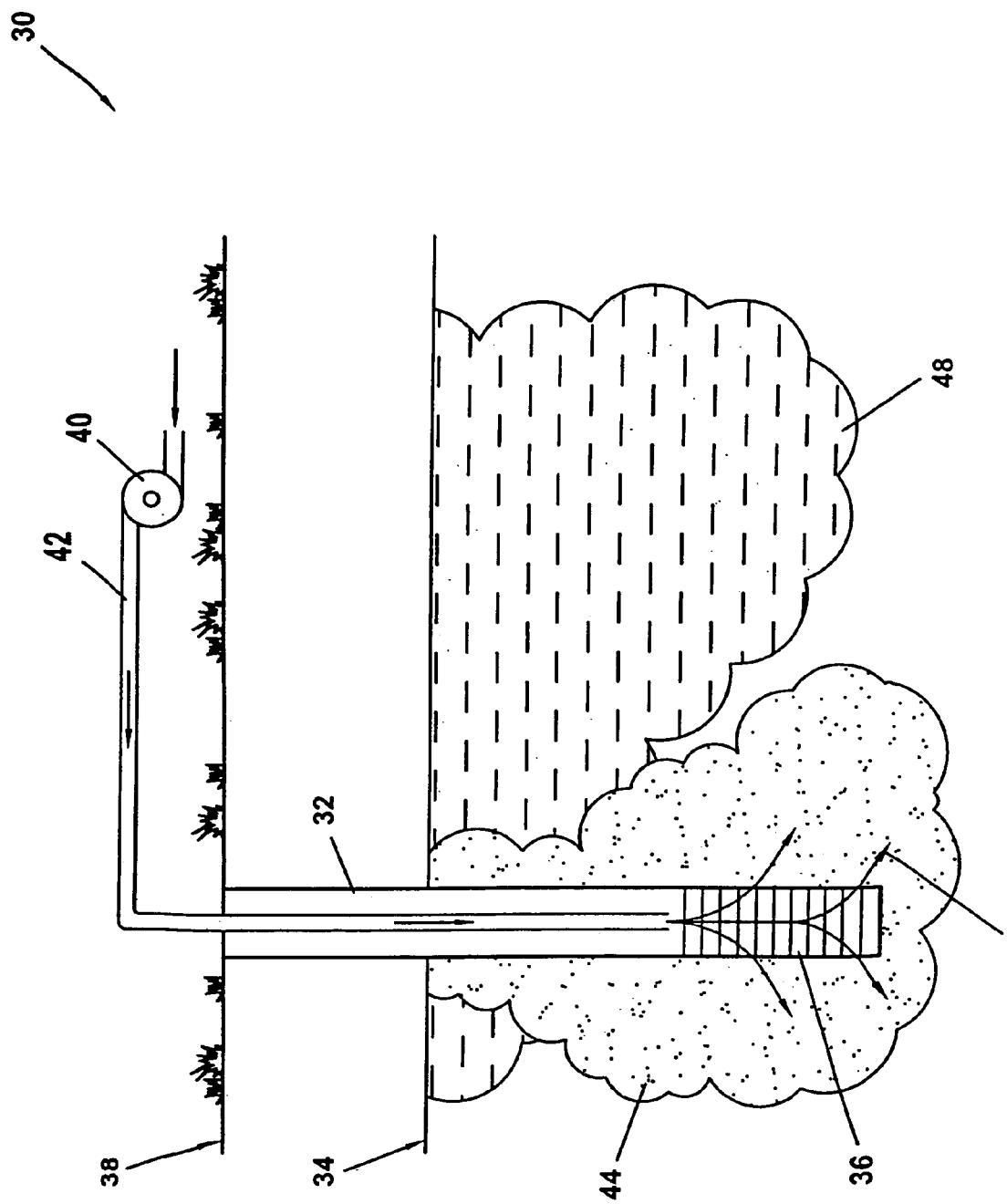
FIG. 2 is a schematic view of one preferred embodiment of the present invention.

FIG. 2 illustrates another method of the present invention 30 for injecting the nanoscale metal 46 of the present invention by pump 40 through an injector 42 into an open bore hole 32 through a screen 36 into a plume 44 that is located beneath ground level 38 and beneath the water table 34. Non-contaminated water 48 beneath the water table is also illustrated.

Figure 3:
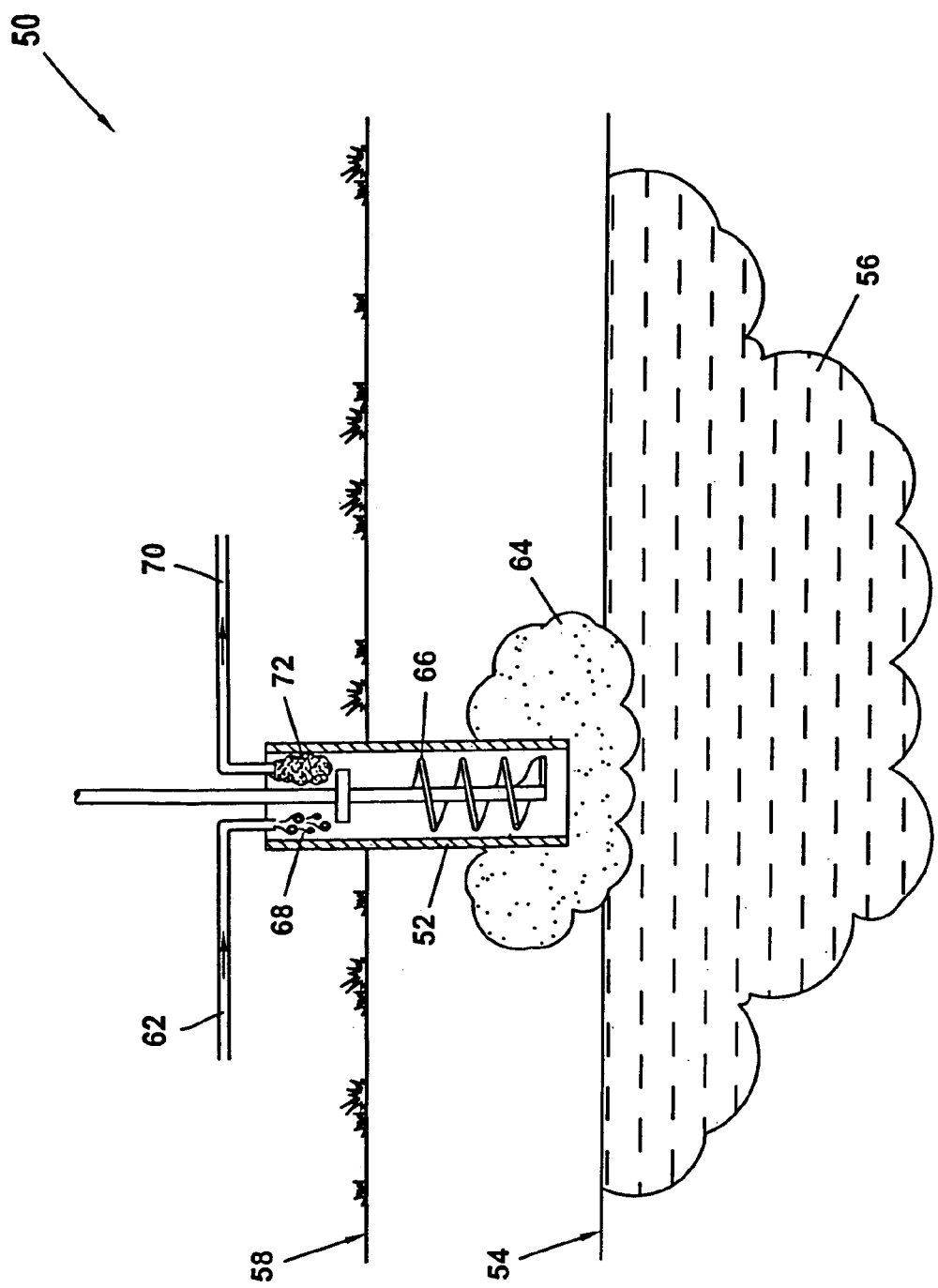
FIG. 3 is a schematic view of one preferred embodiment of the present invention.

FIG. 3 shows another embodiment of a method of the present invention 50 for injecting nanoscale metal 68 of the present invention through an injector 62 through a screen 52 into a plume 64 that is located beneath ground level 58 and above or near the water table 54 with the use of an auger 66 for mixing the soil and a dust or vapor collector 72 for removing the dust through a removal pipe 70. Non-contaminated water 56 beneath the water table 54 is also illustrated.

Figure 4:
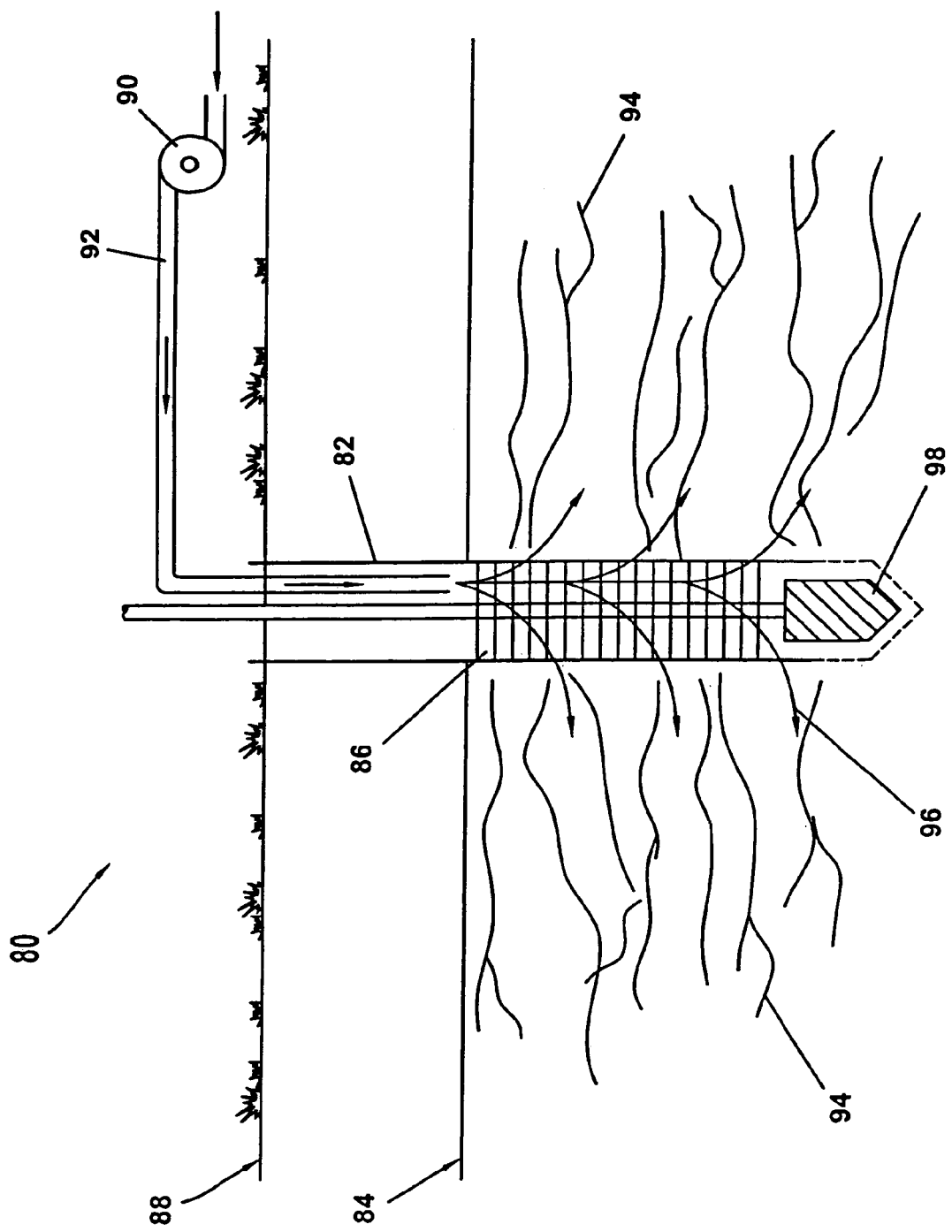
FIG. 4 is a schematic view of one preferred embodiment of the present invention.

FIG. 4 shows another embodiment of a method of the present invention 80 for injecting the nanoscale metal 96 of the present invention by pump 90 through an injector 92 into a open bore hole 82 through a screen 86 into soil beneath ground level 88 and beneath the water table 84 with the use of hydraulic pressure 98 for fracturing the soil 94. The hydraulic pressure 98 is used to fracture the soil 94 and the nanoscale metal 96 is injected either simultaneously or after the hydraulic pressure 98 has been applied.

Figure 5:
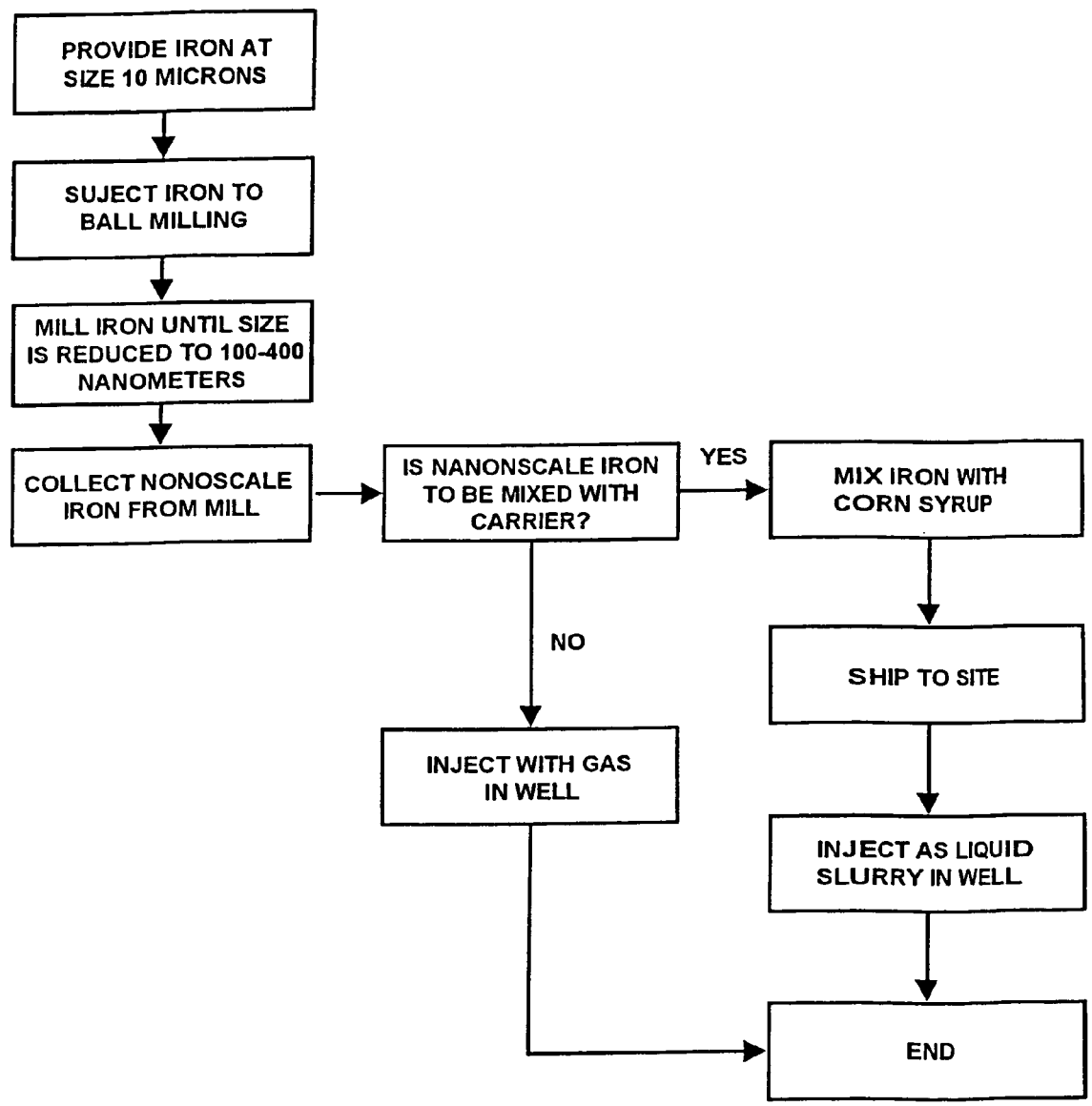
FIG. 5 is a flow chart of one preferred embodiment of the present invention.

FIG. 5 is a flow chart that explains the process of producing the nanoscale metal.

The present invention is a method of producing nanoscale metallic colloids comprising the steps of:
a. Supplying an elemental metal, wherein the size of the elemental metal is in the range of 1-10 microns;
b. suspending the elemental metal in a non-aqueous organic liquid that is non-reactive to the surface of the elemental metal;
c. adding a dispersant;
d. placing the materials in a ball milling system; and
e. agitating the mixture at a rate and time necessary to produce nanoscale particles of product material.

Elemental metal is any metal in its elemental state having a zero valence. Metals that are preferred are selected from the group of iron, tin, zinc and palladium. The most preferred is iron. The elemental metal is initially introduced in the size range of 1-1000 microns and is most preferably 325 mesh metal particles.

The elemental metal may additionally be mixed with a second metal. Any metal may be used for the bimetallic colloid but preferred metals are palladium, platinum, nickel, zinc and tin.

The non-aqueous organic liquid is any liquid that will not react with the surface of the metal and preferably has a high flash point to prevent explosions. The non-aqueous organic liquid is preferably selected from the group consisting of dodecane, butyl acetate and polypropylene glycol ethyl ether acetate and mixtures thereof.

Dispersants are any surface acting agent used to prevent agglomeration of the colloids during the milling process. They are preferably selected from the group consisting of SOLSPERSE® 20,000, SOLSPERSE® 24,000, SOLSERSE® 32,600, SOLSEPERSE® 32,500, DISPERBYK® 108, DISPERBYK® 164, and DISPERBYK® 167 (SOLSPERSE® dispersants available from BYK=Chemie GmbH, Wesel, Germany).

The product material, also called nanoscale metallic colloids, is in the size of approximately 100-400 nanometers.

Comminuation of the metal particles, the non-aqueous organic liquid, and the dispersant may be accomplished by any known milling or mechanical comminuation means or any system where the mechanical agitation is provided by high speed gas jets. Preferably ball milling or rod milling is used.

Additionally, the present invention is to a method of injecting nanoscale metal particles into soil, comprising the steps of:
a. making a colloid suspension having metal particles in the presence of a carbohydrate; and
b. injecting said colloid suspension into the soil through a well at a flow rate sufficient to move the colloid suspension through the soil.

The nanoscale metal particles may be injected by any known method but are preferably injected under pressure (without the use of surfactants) or injected with hydraulic pressure. Most preferably, nitrogen under pressure will be used. The elemental metal or bimetallic colloid may used alone or may be suspended in the nitrogen gas and may be mixed a carbohydrate solution (also called carrier). Alternatively, the carbohydrate solution may be in atomized form and may be injected into the compressed nitrogen gas. The injection may also be achieved with the use of hydraulic pressure in which a slurry of elemental metal or bimetallic colloid and carbohydrate solution are injected. Additionally, sand may also be added to the slurry.

Any carbohydrate solution that creates an oxygen-scavenging environment may be mixed with the metal. Most preferably, corn syrup may be used in suspension with nanoscale metal and injected by pressure into a contaminated sub-soil zone. The corn syrup helps to prevent elemental iron from rusting which would have the effect of lessening the remediation capability of the iron.

The scope of the invention is not to be considered limited by the above disclosure, and modifications are possible without departing from the spirit of the invention.

What is claimed is:

1. A method of remediating contaminated ground water comprising injecting a treatment solution comprising a colloidal suspension of elemental metal particles having a particle size between 100 nanometers and 400 nanometers and a carbohydrate in an organic liquid into the ground, proximate to the contaminated ground water.

2. The method of claim 1, wherein the metal is selected from the group consisting of an iron, a tin, a zinc, a palladium and mixtures thereof.

3. The method of claim 1, wherein the carbohydrate comprises corn syrup.

4. The method of claim 1, wherein the treatment solution additionally comprises a propping agent.

5. The method of claim 1, wherein the treatment solution is injected beneath a water table.

6. The method of claim 1, wherein the treatment solution is injected above a water table.

7. The method of claim 1, wherein the treatment solution is injected under pressure.

8. The method of claim 1 comprising the additional step of fracturing soil around an injection site with hydraulic pressure prior to injecting the treatment solution.

9. The method of claim 1, wherein the treatment solution is injected with hydraulic pressure to fracture soil simultaneously with injection of the treatment solution.

10. The method of claim 1, wherein the treatment solution is mixed in the ground with an auger.

11. The method of claim 10, wherein dust generated by the auger is removed through a dust collector.

12. The method of claim 1, wherein the treatment solution is injected into a compressed nitrogen gas.

13. The method of claim 1, wherein the treatment solution is injected through a wellbore screen.

14. A method for treating a contaminated groundwater, comprising:
providing a borehole which extends from a surface location to a subterranean formation comprising groundwater with at least one contaminant;
injecting a treatment solution comprising a carbohydrate and an elemental metal having a reactivity controlled particle with a nanoscale size suspended in a non-aqueous organic liquid that is not reactive with the elemental metal down the borehole and into the subterranean formation wherein said treatment solution contacts the groundwater.

15. The method of claim 14, wherein the groundwater is contaminated with a chlorinated solvent.

16. The method of claim 14, wherein the elemental metal is selected from the group consisting of iron, tin, zinc, palladium and mixtures thereof.

17. The method of claim 14, wherein the carbohydrate comprises corn syrup.

18. The method of claim 14, wherein the treatment solution additionally comprises a propping agent.

19. The method of claim 14, further comprising the step of hydraulically fracturing the subterranean formation.

20. The method of claim 14, wherein at least a portion of said treatment solution comprises a nano-scale iron.

* * * * *